E. F. NORELIUS & W. TURNBULL.
DOUBLE TRACK TRACTOR.
APPLICATION FILED DEC. 6, 1916.
1,258,605.
Patented Mar. 5, 1918.
2 SHEETS—SHEET 2.
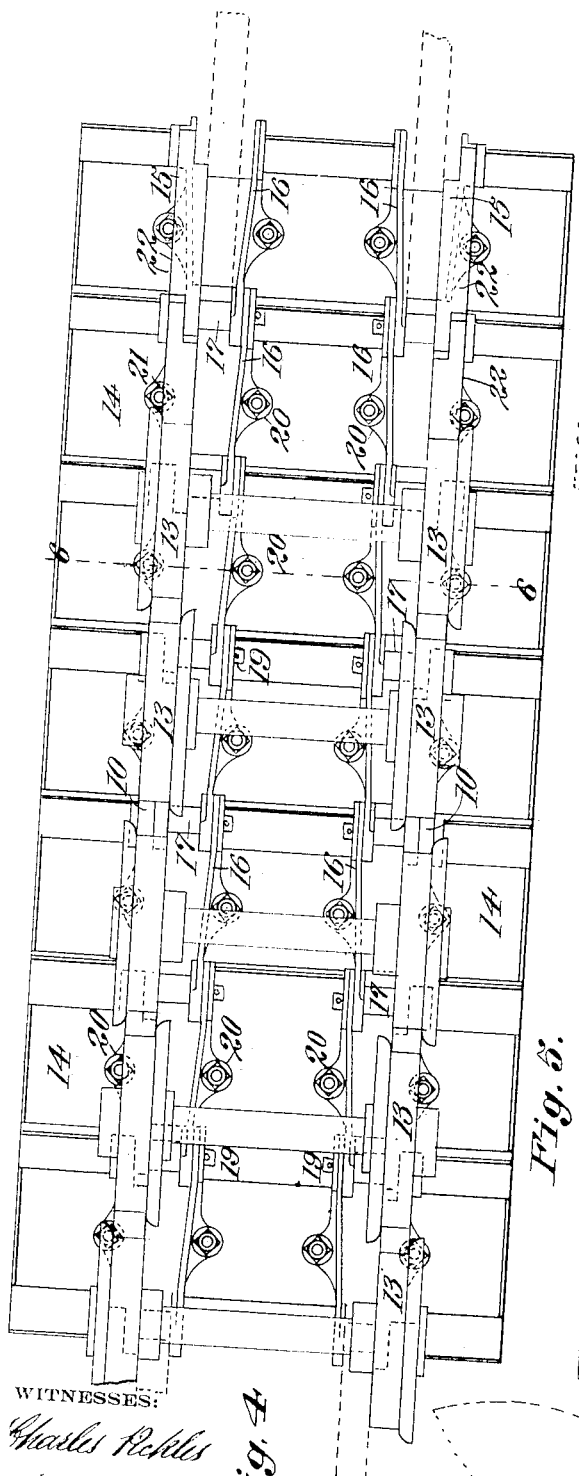
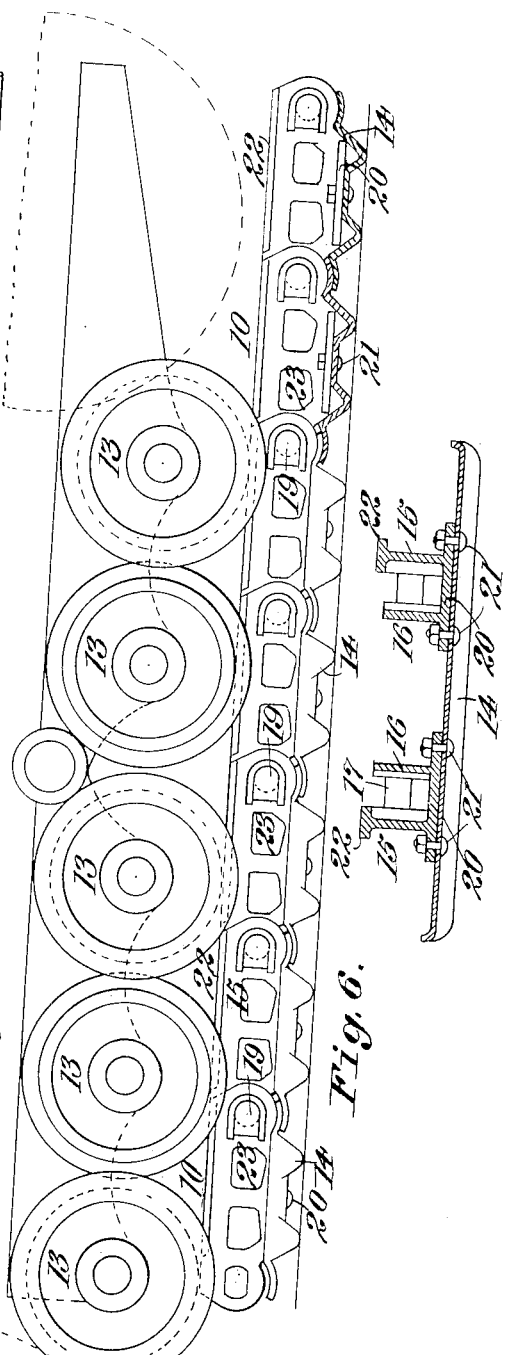
WITNESSES:
Charles Pickles
Thos. Castberg
INVENTORS
Emil F. Norelius
William Turnbull
BY Strong & Townsend
ATTORNEYS

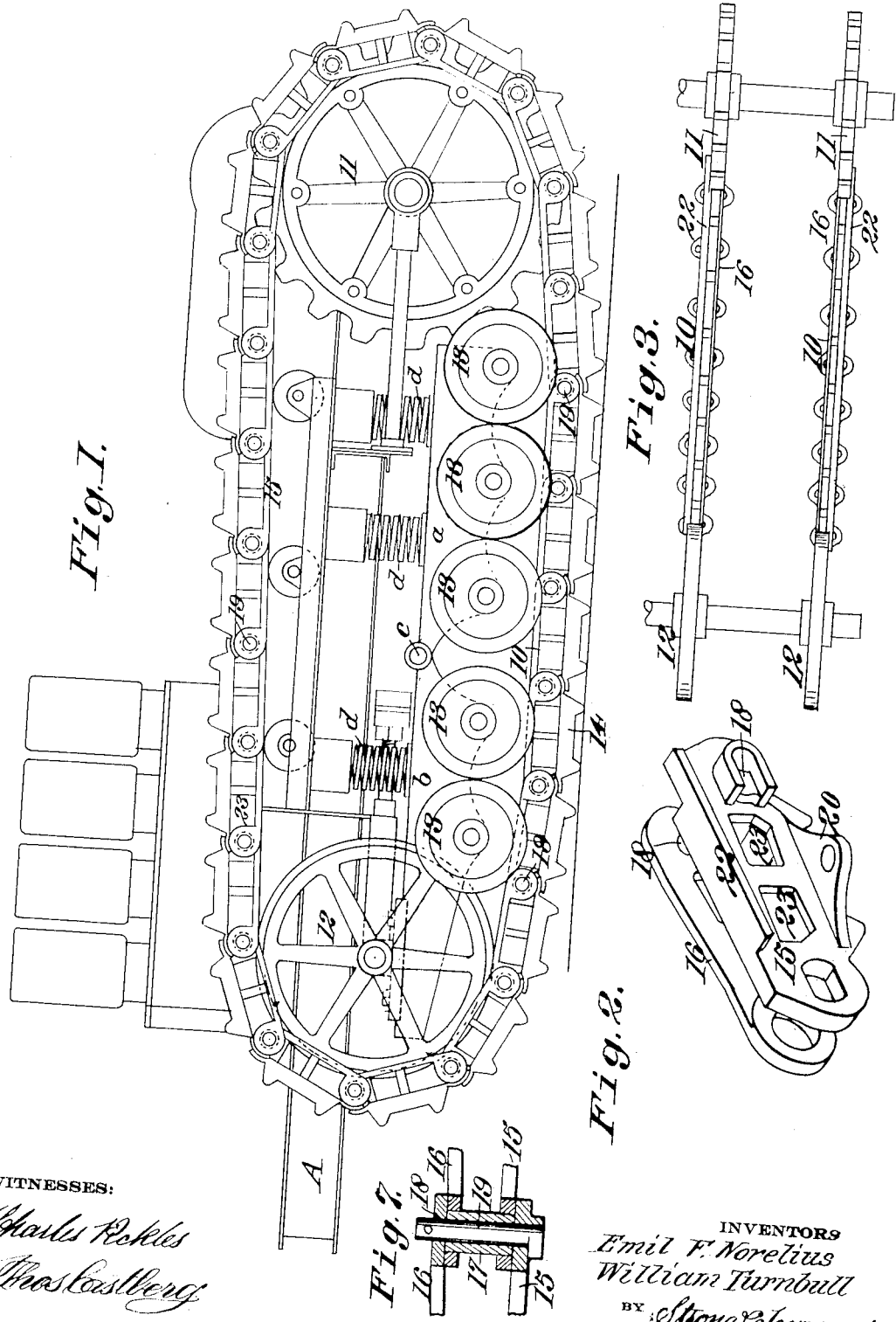

UNITED STATES PATENT OFFICE.

EMIL F. NORELIUS AND WILLIAM TURNBULL, OF PEORIA, ILLINOIS, ASSIGNORS TO THE HOLT MANUFACTURING COMPANY, OF STOCKTON, CALIFORNIA, A CORPORATION OF CALIFORNIA.

DOUBLE-TRACK TRACTOR.

1,258,605.      Specification of Letters Patent.      Patented Mar. 5, 1918.

Application filed December 6, 1916. Serial No. 135,462.

*To all whom it may concern:*

Be it known that we, EMIL F. NORELIUS and WILLIAM TURNBULL, both citizens of the United States, residing at Peoria, in the county of Peoria and State of Illinois, have invented new and useful Improvements in Double-Track Tractors, of which the following is a specification.

This invention relates to tractors and vehicles of the type employing an endless, flexible self-laying track to support the load of the vehicle.

These machines as placed upon the market and illustrated for example in co-pending application Serial No. 77,382, filed February 10, 1916, employ two of these self-laying tracks, one on each side of the vehicle frame, each track composed of steel links connected by case-hardened steel space blocks, and case-hardened steel track pins for engagement with the sprocket teeth. Each link combines an articulated shoe or ground contact surface; the articulations of the links being at the ends of the rail sections. The truck rollers travel on the smooth steel rails of the track links, and carry the entire weight of the tractor.

The present invention is the result of the adaptation of this machine for work in places and under conditions where it has heretofore been impossible to operate a tractor of any sort. For the most extreme soil conditions a 30 inch track is employed giving a total of 60 inches of width of bearing surface for the two tracks which with the extended linear contact of track on each side of the machine gives a total actual bearing surface of about 4800 square inches; the ground pressure being not to exceed three pounds per square inch. These tracks thus provide such an enormous bearing surface that the softest, marshy or re-claimed land can be easily worked. The difficulty heretofore however has been suitably to support and carry such enormous tracks so that they will not rock on the sprockets or become disengaged, or allowed to climb, or be otherwise rendered inoperative. To this end the rails are set extremely wide apart, being near the edges of the shoes, so as to avoid any possibility of twisting the track even when traveling over the roughest ground and in addition the truck rollers are provided with alternate inside and outside flanges instead of single there are double front and rear sprockets for each track and each of these sprockets is set so as to engage with the track near the edge of the shoe.

One form which our invention may assume is exemplified in the following description, and illustrated in the accompanying drawings, in which—

Figure 1 shows a side elevation of a tractor equipped with a chain track of our invention.

Fig. 2 shows a perspective view of one of the link sections of said track.

Fig. 3 shows a plan view in diagram of the double rail track and spaced driving and idler wheels.

Fig. 4 shows a plan view of a portion of the chain track and roller truck mechanism.

Fig. 5 shows a side elevation of the same.

Fig. 6 shows a transverse sectional view of the track.

Fig. 7 shows a sectional view illustrating one manner of connecting the link sections together.

A represents the tractor or vehicle frame, with an endless, flexible self-laying track on each side thereof; each track being made up of a series of articulated spaced link sections 10, adapted to run over spaced co-axial driving sprockets 11 and corresponding spaced co-axial idlers or blank sprockets 12 at the opposite end of the track. The truck frame for each track is made of cast steel in two sections $a$—$b$, hinged together at $c$, the rear section $a$ carrying three sets of truck rollers while the front section carries two sets and also carrying the front idlers or blank sprockets 12. The vehicle frame A is resiliently supported on the truck by the springs $d$.

The sprockets 11—12 are raised sufficiently above the truck rollers 13, so that none of the weight of the vehicle comes on the sprockets 11 or 12; the entire load being borne by the trucks and their rollers 13 upon the endless tracks which are laid down in front of the truck rollers as the apparatus advances.

Track links 10 and shoes 14 are separate; the shoes being pressed from special high carbon plow steel, and the steel links bolted to them. With these wide track shoes 14 there are employed two sets of track links 10, each track link of each set comprising an outer rail head member 22, and inside dwarfed reinforcing member 16. More particularly, each link section comprises a pair of webs or plates 15—16 spaced apart but unequally so at opposite ends, being provided at the end having a narrow width with a gudgeon block 17 centrally bored, and at the opposite end or that having a wider spacing, being adapted to impress a narrow end of the companion link, and having openings 18 to receive a journal pin 19 which extends through the gudgeon block whereby to connect the adjacent links together. The gudgeon blocks also form pin teeth to engage with the teeth on the driving sprocket wheel. The webs or plates 15 and 16 are preferably formed integral with a base plate or chain 20 which extends to opposite sides thereof and bolted to the shoes or tread members 14 by bolts 21. The webs or plates 15 and 16 are dissimilar in that the outer one 15 alone is provided with a flanged head 22 which forms a rail upon which one set of rollers 13 operate. The inside web or plate 16 is really a dwarfed member and is not engaged by the rollers 13 or wheels 11 and 12, but forms a support for one end of the journal pin and gudgeon block and a reinforcing and lateral brace for the rail head member 15. The sides of each of the webs 15 and 16 are preferably cut away to form openings 23 to permit the escape of mud and dirt which may collect between said webs.

By reason of the spacing of the webs 15—16 of the links, the flanges of the rollers 13 may run on either side of the rail head 22 and therefore the rollers may be staggered as shown in Fig. 4, to permit a closer arrangement of the same.

By arranging the rail head 22 on the opposite webs of each of the chains and spacing said chains equi-distantly of the center of the tread members, the weight of the truck mechanism is evenly distributed throughout the track.

This construction provides in effect a double chain track tractor having double sets of spaced co-axial driving sprockets, corresponding idlers on opposite sides of the tractor, articulated trucks with spaced double truck rollers and endless tracks made up of articulated link sections, each section comprising a tread plate with double twin links arranged on opposite sides of the longitudinal center of the track, each twin link consisting of a base member with two up-standing webs, one web carrying a rail head and the other forming a lateral brace to the rail head member with transverse articulating parts between the said web members for engagement with the teeth of a corresponding sprocket, the truck rollers running upon the rail heads, the truck rollers being flanged and staggered so as to extend alternately to the outside and inside of the rail head members.

Various changes in the construction and arrangement of the several parts herein shown and described, may be employed without departing from the spirit of our invention as disclosed in the appended claims.

Having thus described our invention what we claim and desire to secure by Letters Patent is—

1. A link for self-laying tracks comprising a base member, a rail member upstanding therefrom, and a dwarfed lateral reinforcing web for said rail member.

2. A track section for self-laying tracks, comprising a tread plate, two spaced rail members upstanding thereon, each rail member comprising a web with a rail head, and a lateral reinforcing web which is connected to the tread plate and to the rail head web.

3. In a traction engine, the combination with the main frame, and an endless self-laying track on each side thereof, each track comprising articulated sections with a double set of link chains, each link chain having a continuous articulated rail member and sprocket engaging means, a double set of sprockets on one side of the engine frame for engaging the double set of link chains on the track on that side of the machine, and an articulated truck within the track having staggered flanged rollers running on the rail heads of the double set of chains, the aforesaid double idlers being supported on one of the sections of the articulated truck, and springs interposed between the main frame and the truck sections.

4. A double chain track for tractor roller truck mechanism comprising tread members, endless flexible chains spaced equi-distantly from the center of said tread members and secured thereto, each of said chains comprising a series of articulated link sections, each link being formed of laterally spaced side bars, the outer one of which is provided with a rail head to receive and support a part of the roller truck mechanism of the tractor.

5. A double chain track for tractor roller truck mechanism, comprising laterally spaced endless flexible chains, each made up of a series of articulated link sections, said link sections comprising each a pair of laterally spaced side plates, the plates on one side being provided with flanges forming rails to receive a part of the roller truck mechanism, and the plates at the opposite side being dwarfed to clear said truck mechanism, and pin teeth extending between said plates and supported thereby, for engagement with a driving member on the tractor.

6. A double chain track for tractor roller truck mechanism, comprising laterally spaced, endless flexible chains, each made up of a series of articulated link sections, said link sections comprising each a pair of laterally spaced side plates, the plates at one side being provided with flanges forming rails to receive a part of the roller truck mechanism, and the plates at the opposite side being dwarfed to clear said truck mechanism, and pin teeth extending between said plates and supported thereby for engagement with a driving member on the tractor, a base plate joining said side plates together, and tread members carried detachably on said base plates.

7. In a chain truck for tractors, a series of articulated link sections, each comprising laterally spaced side plates, those at one side being provided with flanges at their inner longitudinal edges forming an annular track, and those at opposite sides being without flanges, and pin teeth extending between said plates and supported thereby, for engagement with a toothed driving member on the tractor.

8. A chain track for tractors, comprising laterally spaced, endless, flexible chains, each made up of a series of articulated link sections, said link sections comprising each a pair of laterally spaced side plates, the plates at the outer side being provided with flanges on their inner, longitudinal edges forming an annular track, and those at the inner side being without flanges, pin teeth extending between said plates and supported thereby for engagement with a toothed driving member on the tractor, and a tread member connected to each pair of spaced links.

9. In a tractor, co-axially spaced sprocket driving wheels, similarly spaced idler wheels, roller truck mechanism comprising co-axially spaced rollers flanged in fore and aft arrangement, and a double chain track running over said driving and idler wheels and supporting said rollers, said track comprising laterally spaced endless, flexible chains, each comprising a series of articulated link sections, each link section being formed of laterally spaced side plates, the plates at one side being provided with flanges forming a track to support the overlying rollers, the plates at the other side being without flanges and free of the rollers, and pin teeth extending between the side plates of said links and supported thereby for engagement with the teeth on the alined driving sprocket wheel.

10. In a tractor, co-axially spaced sprocket driving wheels, similarly spaced idler wheels, roller truck mechanism comprising co-axially spaced rollers flanged in fore and aft arrangement, and a double chain track running over said driving and idler wheels and supporting said rollers, said track comprising laterally spaced, endless, flexible chains, each comprising a series of articulated link sections, each link section being formed of laterally spaced side plates, the plates at one side being provided with flanges forming a track to support the overlying rollers, the plates at the other side being without flanges and free of the rollers, and pin teeth extending between the side plates of said links and supported thereby for engaging with the teeth on the alined driving sprocket wheel, adjacent rollers of said truck mechanism having their flanges staggered so as to extend alternately between the side plates of the links and to the outside of the flanged side plates.

11. In a tractor, duplicate sprocket driving wheel, duplicate idler wheel, a double chain track running over said wheels and comprising a pair of endless, flexible chains laterally spaced apart, each formed of a series of articulated link sections, said sections comprising a pair of laterally spaced side plates between which alined driving and idler wheels operate, and pin teeth between said plates for engagement with the teeth of the driving wheels, roller truck mechanism comprising fore and aft arranged duplicate rollers overlying the side plates at one side of each chain, and flanges on the plates at such side forming a track for said rollers.

12. A link for self-laying tracks, comprising a base with two up-standing webs, one of said webs only provided with a rail head, and pivot pins supported between and at the ends of the webs.

13. A link for self-laying tracks, comprising a base with two up-standing webs, one of said webs only provided with a rail head, and pivot pins supported between and at the ends of the webs, said webs diverging from each other from end to end of the link to allow the contracted ends of the webs of a neighboring link to enter between the widened ends of the companion link.

14. A vehicle having a flexible, endless, self-laying track, in which the track is provided with duplicated elements each comprising a rail member and a dwarfed lateral reinforcing web, each element being mounted upon the tread plate and to one side of the center of the track with the reinforcing webs on the inside, with intermediate pin teeth between the rail member and its reinforcing web, and co-axially mounted duplicate driving sprockets and idler sprockets for said track.

15. In a tractor, an endless, flexible self-laying track in which each track section is provided with duplicated means for engaging two co-axially arranged driving sprockets and two co-axially arranged idler sprockets for the track, rollers interposed between said pairs of driving and idler sprockets, track pins securing said track sections to each other, spacing blocks positioned upon said pins, and duplicated means for railing the rollers of the truck mechanism while at the same time affording supports for one end of the track pin and space block, the object of said duplicated means being to facilitate the employment of extra wide tracks.

In testimony whereof we have hereunto set our hands in the presence of two subscribing witnesses.

EMIL F. NORELIUS.
WILLIAM TURNBULL.

Witnesses:
P. EHRUFUR,
H. S. BOSWELL.